United States Patent [19]

Edwards et al.

[11] 4,140,805

[45] Feb. 20, 1979

[54] PROCESS OF PRODUCING USEFUL MATERIALS FROM PLANTS

[76] Inventors: George W. Edwards; Arrie W. Edwards, both of Rte. 4 - Kay Dr., Jackson, Tenn. 38301

[21] Appl. No.: 776,861

[22] Filed: Mar. 11, 1977

[51] Int. Cl.² ............................................... A23L 1/28
[52] U.S. Cl. ................................................... 426/429
[58] Field of Search .................. 426/50, 52, 49, 46, 426/51, 429, 576

[56] References Cited

U.S. PATENT DOCUMENTS

| | | | |
|---|---|---|---|
| 3,218,172 | 11/1965 | Hess | 426/429 |
| 3,565,634 | 8/1967 | Osterman | 426/429 |
| 3,579,355 | 5/1971 | Wyss et al. | 426/576 |
| 3,780,183 | 12/1973 | Edwards et al. | 426/50 |
| 3,833,738 | 9/1974 | Edwards et al. | 426/52 |

OTHER PUBLICATIONS

Kohler et al., (9th Technical Alfalfa Conference Proceedings 1965, pp. 25 and 26).

*Primary Examiner*—Joseph M. Golian
*Assistant Examiner*—Elizabeth A. Hatcher
*Attorney, Agent, or Firm*—Merriam, Marshall & Bicknell

[57] ABSTRACT

Alfalfa or clover is extracted with an organic solvent to separate lipids and leave a solvent insoluble residue. The solvent insoluble residue is treated with a base and the base soluble and insoluble fractions separated and further processed into human and animal edible products. The lipids may be used as plasticizers in polymers or copolymerized with monomers or polymers.

7 Claims, 1 Drawing Figure

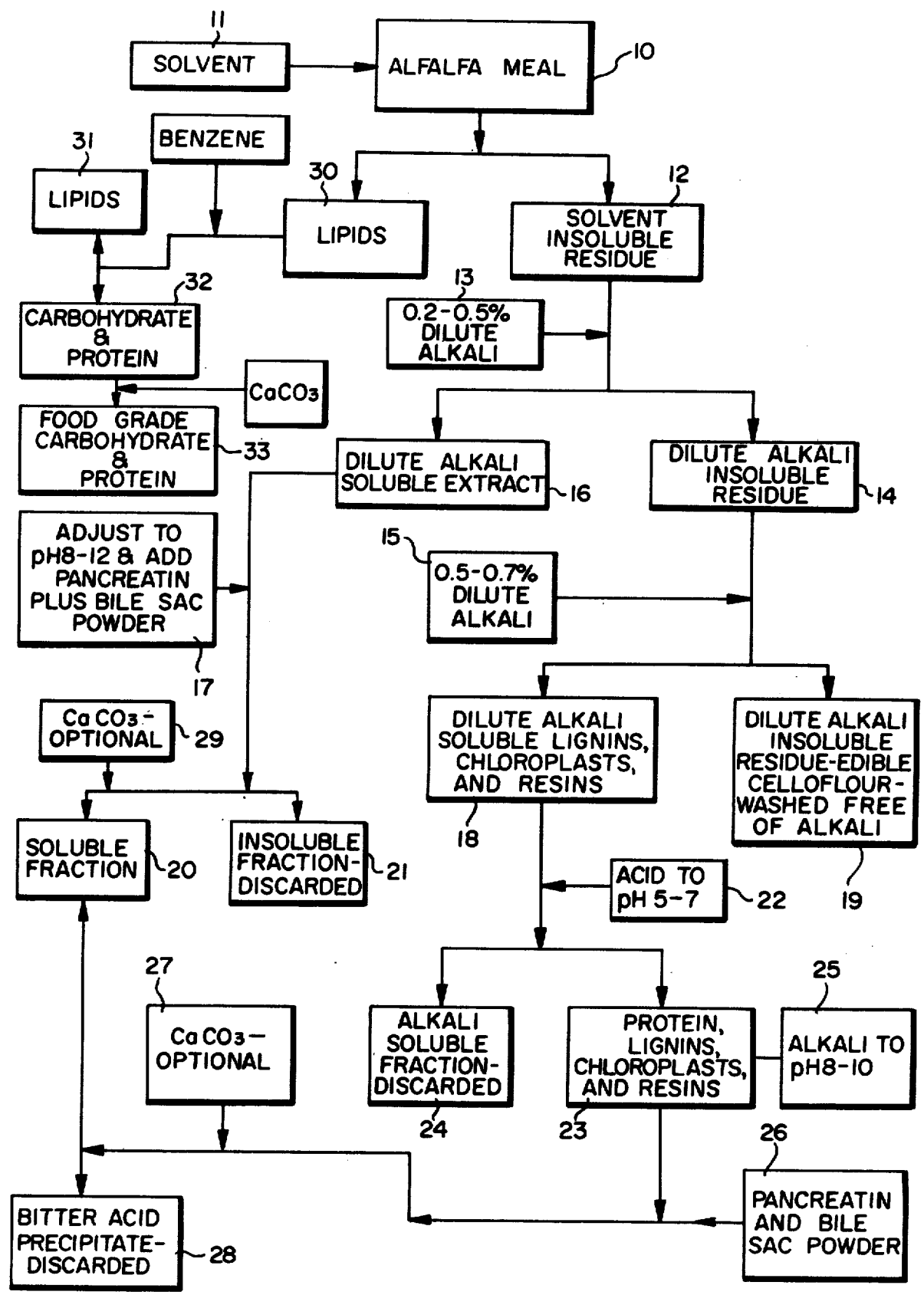

PROCESS OF PRODUCING USEFUL MATERIALS FROM PLANTS

This invention relates to the processing of protein-containing plant material to produce industrial products and products edible by humans, livestock, poultry and other animals.

Alfalfa and clover contain crude protein and are used commonly as food for animals. These plants, however, have been used sparingly for human food because they have an unpleasant taste.

U.S. Pat. No. 3,780,183 discloses the preparation of human food products from plant raw materials, such as alfalfa and clover, by contacting the plant substance with an aqueous solution of a base to form an aqueous extract, treating the aqueous extract with pancreation to convert starches into soluble carbohydrates, digest lipids and release protein hydrolysates. The resulting aqueous solution, advisably after separation of lipids and lipoproteins by settling, can be added to other foods without prior concentration, or it can be concentrated by removal of water before being so used.

An improvement of the described process is disclosed in U.S. Pat. No. 3,833,738. The process of this patent first treats alfalfa or clover with an aqueous basic solution to form a slurry which is then treated simultaneously or serially with pancreatin and a bile-containing material, such as gall sac powder or bile salts. The water soluble and insoluble celloflour portions are then separated. Both are useful food products.

Although the processes of the two United States patents discussed above lead to useful products, those products have a bitterness which is undesirable due to residual amounts of lipids, saponins, resins and lignins in the products.

According to the present invention, and with reference to the attached drawing constituting a flow sheet, it has been found that food products suitable for human and animal use, and having improved taste and palatability over the products obtained using the previously described patented processes, can be produced by first extracting lipids from the plant material 10 with a suitable solvent 11 and then at least treating the solvent insoluble residue 12 with a dilute aqueous base 13 such as dilute alkali. The residue 14 insoluble in the dilute aqueous base constitutes an edible celloflour which is particularly suitable for incorporation into bread. A second extraction with a dilute aqueous base 15 of this insoluble residue 14 or celloflour is advisably performed to further improve the quality of the insoluble celloflour. Treatment of the soluble fraction 16, from the dilute aqueous base extraction, with pancreatin and a source of bile 17 breaks down saponins which are present into sugar, and other materials into soluble and insoluble products, which are edible.

The attached drawing constituting a flow sheet, which is keyed to the above and subsequent description of the invention, is provided to facilitate following the process through the steps.

The extracted lipids obtained by the solvent extraction is a highly useful plasticizer in many polymeric materials. The lipids contain polyunsaturated materials, i.e. oils and waxes, which enter into polymerization reactions with various monomers to form novel polymeric products, including films. The lipids thus is a potential industrial product having a wide variety of uses in the polymer, plastic and coating fields.

In performing the first step of the previously broadly described process, the plant material 10 can be extracted with any suitable solvent or mixture of solvents 11 in which the plant lipids have significant solubility. The solvents generally considered most useful are the low boiling solvents such as lower alkanols such as alcohols having 1 to 4 carbons, lower alkanones such as ketones having 3 to 6 carbons, lower alkanoic acids such as carboxylic acids having about 1 to 4 carbons, esters of lower alkanoic acids in which the ester has a total of about 3 to 8 carbons, monocyclic saturated and unsaturated hydrocarbon solvents such as benzene, cyclohexane, cyclopentane, cyclohexanol and cyclohexanone, bicyclic unsaturated hydrocarbon solvents such as naphtha and alkanes having 5 to 8 carbons such as hexane, heptane and octane. Generally, a highly polar solvent mixed with a solvent low in polarity or with a nonpolar solvent gives good results in separating the plant lipids. The polarity of the solvent mixture is advisably adjusted to about match the range of polarity of the initially extracted lipids, which contains very polar carbohydrates and proteins which may subsequently be removed. Specifically, an polar alcohol solvent mixed with a ketone solvent gives particularly good extraction of lipids. The mixture of a lower alkanone with one or more lower alkanols or lower alkanoic acids, or mixture of a lower alkanol and a lower alkanoic acid with an alkanone, will usually provide the highest lipids extraction yields.

To facilitate the extraction, the plant material is advisably first chopped or ground to a small size, and furthermore is dried to remove most of the water before the extraction is begun.

Any suitable conventional extraction apparatus may be used such as a large Soxhlet extraction assembly or simply a Buchner funnel on which the plant material may be extracted by washing. A single extraction, or two or more extractions, may be employed. With a Soxhlet extractor about two to three hours are required for the extraction. Also, any suitable amount of solvent per plant material ratio may be employed but generally the solvent volume will be equal to, or more than, the nominal bulk volume of the plant material. In a specific procedure one kilogram of alfalfa meal may be covered with about two liters of solvent and mixed thoroughly. Excess solvent is drained off and the residue is pressed to remove as much solvent as possible. This procedure is usually repeated twice to give satisfactory results.

The extraction may be conducted at from room temperature to the boiling point of the solvent, and preferentially near or at the boiling point at atmospheric pressure. Increased pressure could be used if desired.

The solvent extraction not only extracts the lipids but much of the water which may be present in the plant material. Even if the plant material is dried before it is contacted with the solvent, water bound in the membranes and not removed by drying, is removed.

The end point of freeing the fibrous plant substance of lipids is observed by the color of the extract which goes from dark green at the start to yellow when the lipids has been essentially all extracted from the plant substance. The extraction removes not only the lipids but pigments and glycolipid lipoproteins as well.

Following the extraction, the solvent may be separated from the lipids by distillation under pressure and the solvent recovered.

The following Table I gives specific examples of solvents and solvent mixtures used to extract lipids from alfalfa meal and the amount of lipids obtained. From 2 to 2.5 liters of solvent or solvent mixture was used per kilogram of alfalfa meal.

Table I

| | Solvents | Grams of lipids from 10 grams of alfalfa meal |
|---|---|---|
| 1. | Ethyl acetate-ethanol (1:1) | .64 |
| 2. | Methyl ethyl ketone-ethanol (1:1) | .91 |
| 3. | Methyl ethyl ketone-ethyl acetate (1:1) | .37 |
| 4. | Ethyl acetate-methyl ethyl ketone-isopropanol (1:1:1) | .48 |
| 5. | Ethyl acetate-methyl ethyl ketone-ethanol (1:1:1) | .75 |
| 6. | Ethanol-acetone (1:1) | .60 |
| 7. | Acetone-methanol (2:1) | .86 |
| 8. | Acetone-ethanol (2:1) | .46 |
| 9. | Methyl ethyl ketone-ethanol (2:1) | .92 |
| 10. | Methyl ethyl ketone-ethyl acetate-methanol (10:10:1) | .51 |
| 11. | Acetone-methyl acetate-ethanol (1:1:1) | .75 |
| 12. | Methyl ethyl ketone-acetone-methanol (1:1:1) | .41 |
| 13. | Benzene | .25 |
| 14. | Acetone-methyl acetate-methanol (1:1:1) | .75 |
| 15. | Cyclohexane-methyl ethyl ketone-ethanol (1:1:1) | .54 |
| 16. | Ethanol-cyclohexane (1:1) | .27 |
| 17. | Benzene-acetic acid (4:1) | .25 |
| 18. | Hexane-ethanol (1:1) | .37 |
| 19. | Ethanol-methyl ethyl ketone-acetic acid (45:45:10) | 1.05 |
| 20. | Ethanol-methyl ethyl ketone-cyclohexane (4.5:4.5:1) | .65 |
| 21. | Ethanol-methyl ethyl ketone-formic acid (45:45:10) | .90 |

The lipids obtained using the solvents of Table I will generally contain about 90% lipids and 10% protein and carboyhydrate. While Table I shows solvent system No. 19 is the most efficient in extracting lipids, the subsequent removal of acetic acid is not as readily achieved as with the other solvent systems. Because of this it is now considered that solvent system Nos. 2 and 9 are the most suitable ones to use.

The following Table II provides comparative analytical data for the composition of: (1) alfalfa meal, (2) alfalfa meal from which lipids have been extracted, (3) alfalfa meal lipids and (4) a celloflour obtained from the dilute alkali extraction insoluble residue after lignins and saponins are removed.

Table II

| | Ash% | Crude protein% | Digestible protein% | Crude fat% | Crude fiber% | Carbo-hydrate | Digestible carbohydrate% | Total nutrients |
|---|---|---|---|---|---|---|---|---|
| 1. | 4.75 | 16.93 | 11.34 | 1.6 | 33.30 | 43.41 | 47.68 | 59.03 |
| 2. | 5.03 | 18.12 | 12.32 | .70 | 31.4 | 44.74 | 47.35 | 59.68 |
| 3. | | 9.3 | | 86.7 | | 4.0 | | |
| 4. | 3.68 | 12.87 | 8.75 | .5 | 54.10 | 28.84 | 49.17 | 57.92 |

The lipids 30 from the solvent extraction of the plant material includes protein and carbohydrates. The total of protein and carbohydrate may be about 7 to 10% by weight of the extracted material. The lipids may be separated from the protein and carbohydrate mixed therewith by extraction with benzene, or some other hydrocarbon solvent, in which the lipids are more soluble. The extraction produces a lipids product 31, which is soluble in the extracting solvent, and an insoluble product 32 comprising carbohydrates and protein. The product 32 may be washed with calcium carbonate to precipitate fatty acids, lignin acids and lipids and obtain a food grade carbohydrate and protein product 33.

The lipids from alfalfa has a flow point of 50°-55° C. which rises on exposure to air due to addition of oxygen to double bond unsaturation. The lipids is highly unsaturated. The lipids product 31 has an iodine number of 120-150 compared to soybean oil with an iodine number of 116-145.

Thin layer chromatography of lipids extracted from alfalfa meal gives three major spots with $R_f$ 0.2, 0.3, and 0.5 with formic acid-ether-hexane. These are polar lipids characteristic of phospholipids. With chloroform-methyl ethyl ketone-ethyl acetate (50-2.5-2.5) as the chromatography solvent system, the $R_f$ were 0.13, 0.4, 0.66 and 0.93 showing the less polar component in the lipids. Silica gel G was the binder on glass plates. This confirms the lipids is a complete mixture of fats found in the alfalfa plant. This dual character of the lipids — the polar part and the nonpolar part — makes it useful for blending with a large number of monomers before, and polymers after, polymerization. The polar components have hydrogen bonds for binding with the double bonds and polar groups in polymers and the nonpolar components of the lipids give lubrication to make polymers flexible and give sealing properties of natural oils like linseed oil.

The insoluble plant residue 12 left after the solvent extraction may be dried and ground up and used as an animal feed. More suitably, however, the insoluble plant residue 12 is further treated to make a human food by extracting it with a dilute aqueous base 13 such as of about 0.2 to 0.5% alkali (0.25% optimum). This alkali extraction removes the soluble proteins and carbohydrates which are added to product 17 to produce soluble food fraction 20. This alkali extraction removes resins, lignins and chloroplasts from an insoluble residue 14 which may then be separated and treated again with a dilute aqueous base 15, such as with 0.5-0.7% sodium hydroxide to remove alkali soluble lignins, chloroplasts and resins 18 and leave as a residue an insoluble celloflour 19 suitable for use as human food after being washed free of alkali by water.

While a considerable number of basic materials can be used for the extractions, it is advisable to employ an alkali metal hydroxide or carbonate, or an alkaline earth hydroxide or carbonate, or any combination of these bases in aqueous solution. Sodium hydroxide, sodium carbonate, potassium hydroxide, potassium carbonate, magnesium hydroxide, magnesium carbonate and calcium hydroxide and mixtures thereof are specific bases which can be used in aqueous solution. Sodium hydroxide, because of its low cost, effectiveness, suitability for use in food processing and ready availability, is advisably employed. Unless otherwise clearly indicated the word "alkali" is used herein in its broad sense to mean a moderately strong to strong inorganic basic material and is not limited to sodium hydroxide or potassium hydroxide.

The length of time the alfalfa or clover is treated with the base is not critical. One hour of heatig at up to 65° C. generally is sufficient.

Pancreatin and a source of bile 17 is added to the dilute aqueous base extract of the solvent insoluble plant material 16 from which the plant material 14 insoluble in the dilute aqueous base has been removed, after adjusting the extract to pH 8-12. The mixture is then incubated for about 24-30 hours.

The amounts of pancreatin and bile containing material used may vary from 0.005% to 0.5% of each based on the dry weight of alfalfa or clover used, with approximately 0.2% pancreatin and 0.02% bile being the optimum concentrations. The ratio of the weight of the pancreatin to the bile-containing material should be about ten to one. For example, in a preferred embodiment one pound of dry alfalfa meal, 0.3 gram of pancreatin and 0.03 gram of gall sac powder are used, the combined enzymes constituting 0.25% of the dry alfalfa meal. The time of incubation with pancreatin and the bile containing material, using a temperature in the range of 25°-65° C., likewise is not critical, with 24-30 hours generally being sufficient. Digesting longer than 30 hours with enzyme is not desirable due to too much digestion of the protein.

In my prior patents referred to above, the pancreatin and the bile-containing material functioned primarily as extracting agents and less as digesting agents. Since the lipids are first removed by solvent extraction, the solvent insoluble, alkali soluble, material is much more readily digested by pancreatin and the bile-containing material.

After digestion with pancreatin and the bile-containing material is completed, the soluble fraction 20 of the digested slurry may be separated from the residue or insoluble fraction 21 by centrifugation or filtration through coarse cloth. Calcium carbonate 29 may be optionally added to the soluble fraction 20 to stabilize natural carotene and bring out undesirable, unpalatable lignins and saponins. The precipitate may be removed by decantation and filtering. The insoluble fraction 21 is discarded.

The dilute alkali soluble fraction 18 is brought to pH 4 to 7 by the addition of an acid 22 such as hydrochloric acid, sulfuric acid or phosphoric acid, causing lignin, chloroplasts and resins to flocculate and settle out 23. The supernatant liquid extract 24, which has a yellow color, is removed by decantation, and discarded. The lignin, chloroplasts and resins are resuspended in alkali 25 to pH 8 to 10 and then digested with pancreatin and bile sac powder 26 for 24-30 hours. After that lignins and resins are removed, such as by filtering. Calcium carbonate 27 may then be added to precipitate out bitter materials, such as bitter acids 28. The precipitate may then be removed, such as by filtration and the soluble fraction added to soluble fraction 20.

The nutritional characteristics of celloflour make it a useful extender for addition to meats, such as sausage or hamburger, as well as other foods. When a portion of hamburger is replaced by celloflour, very little difference in flavor can be detected. When celloflour and/or the soluble fraction is added to yeast breads, biscuits or corn bread, the flavor of the bread is not appreciably altered. In fact, in this use the celloflour and/or the soluble fraction serves as an excellent growth medium for yeast.

Use of Lipids in Polymers

The lipids solvent extracted from plant materials as described above, is soluble in many of the same solvents in which monomers and polymers are soluble. As a result, the lipids 30 and 31 are soluble in those monomers and polymers which share similar solubility in the same solvents. The lipids 30 and 31 are compatible with the monomers before polymerization and with finished polymers produced from the monomers.

The lipids has an extremely wide compatability with natural and synthetic polymers. The lipids is soluble in styrene up to at least 20% by weight of the styrene. However, only up to about 8% can be added without inhibiting polymerization of styrene enough to make further addition impractical. The lipids is soluble in fast setting epoxy monomer up to about 25-30% by weight of the epoxy monomer. When mixed with a hardner no inhibition of polymerization of fast-setting epoxy resins mixed with up to 25% by weight of lipid extract is detected.

The lipids is miscible with, in addition to styrene and fast-setting epoxy, the following: alkyd resins, acrylonitrile-styrene mixture, styrene-methyl methacrylate mixture, styrene-butadiene mixture, vinyl chloride, polyethylene, polyurethane, polypropylene, natural rubber and synthetic rubber, gilsonite, asphalt, vinyl alcohol, urea melamine, acrylics, unsaturated polyesters and phenolics. The fact that the lipids has double bonds give the possibility of vulcanizing and cross-linking polypropylene and polyethylene. Linear polystyrene (Styrofoam) can be dissolved in ethyl acetate, methyl ether ketone and epoxidized lipids (not less than 1%).

Epoxidized lipids is produced by treating the extracted lipids 30 and 31 with 1% of a mixture of methyl ethyl ketone peroxide, benzoyl peroxide or perbenzoic acid with a trace of $MnO_2$ to act as an oxygen carrier for the epoxidation. Heating up to 100° C. speeds up the epoxidation. More than 24 hours is required at room temperature, whereas one to two hours at 80° C. is sufficient for the epoxidation.

In the following Table III, formulations of the epoxidized lipids (EL) mixed with other listed components are given. The amounts are given in parts by weight. Lipids 31 is preferred in the formulations except in No. 10. Ordinarily the epoxidized lipids is added to the plastic.

Table III

| 1. | 8 | parts EL | 6. | 80 | parts fast-setting epoxy with hardner |
|---|---|---|---|---|---|
| | 62 | parts styrene monomer | | | |
| | 30 | parts acrylonitrile monomer | | 20 | parts EL |
| 2. | 92 | parts styrene | 7. | 99 | parts linear poly-styrene (Styrofoam) |
| | 8 | parts EL | | | |
| | | | | 1 | part EL |
| 3. | 80 | parts styrene | | | |
| | 20 | parts EL (31) | 8. | 95 | parts Styrofoam |
| | | | | 5 | parts EL |
| 4. | 48 | parts styrene monomer | | | |
| | 48 | parts acrylonitrile monomer | 9. | 75 | parts light grade asphalt |
| | | | | 24.5 | parts EL (30) |
| | 4 | parts EL | | 0.5 | part succinic acid |
| 5. | 75 | parts styrene monomer | 10. | 75 | parts light grade asphalt |
| | 23 | parts fast-setting epoxy with hardner | | 24.5 | parts EL (31) |
| | | | | 0.5 | part succinic acid |
| | 2 | parts EL | | | |
| | | | 11. | 75 | parts light grade asphalt |

Table III-continued

| | | |
|---|---|---|
| | 13 | parts EL (31) |
| | 12 | parts natural or reclaimed rubber |

Formulations 1 to 4 in Table III are polymerized using benzoyl peroxide and methyl ethyl ketone peroxide as catalysts in an autoclave, or in an open container, at 80°–120° C. to bring about polymerization within a reasonable time. In some paint or coating applications the peroxide would be added at the time of application. In formulations 5 and 6, the addition of EL to the fast setting epoxide and hardner did not slow down the setting time. Formulations 7 and 8 are physical mixtures of the EL as a plasticizer with the linear styrene monomer Styrofoam. Films of the products of Table III could be used as wood sealers or in flexible films. The film could be used on pasteboard boxes to waterproof and seal them. Styrofoam, which is used for packing and normally disposed of by burning, could be recycled by grinding and reprocessed with the epoxidized lipids (EL).

A distinct advantage of epoxidized lipids as a plasticizer is that it is a natural pigment for plastics. The pigment is a mixture of xanthophylls. When the concentration of epoxidized lipids is below 10% the color of the plastic is buff and very similar to many molded plastic articles in use. When the concentration in the plastic is 20–25% the color is dark green.

In the following Table IV data is presented showing that a styrene-epoxidized lipids (EL) film placed on wood blocks withstands immersion in water better than styrene films made without the EL.

Table IV

| | Block No. | | |
|---|---|---|---|
| | 1 | 2 | 3 |
| Wt. of block plus coating | 5.73 g | 5.80 g | 6.70 g |
| Wt. of block | 5.67 g | 5.46 g | 6.50 g |
| Wt. of coating | .06 g | .34 g | .20 g |
| Wt. of block after 24 hrs. immersed in water | 8.30 g | 8.24 g | 10.50 g |
| Wt. of coated block before immersion | 5.73 g | 5.80 g | 6.70 g |
| Wt. of water gained | 2.57 g | 2.44 g | 3.80 g |

Block 1 was coated with a 5% mixture of 1% epoxidized lipids and 99% styrene. Block 2 was coated with 10% styrene solution. Block 3 was coated with 5% styrene solution. Examination of the coatings showed that the styrene coating had cracks, while the styrene mixed with epoxidized lipids gave a smooth impervious varnish type film. The solubility and compatability of the epoxidized lipids in the plastic gives a film with fewer blemishes and pin holes than a styrene film made without the epoxidized lipids. Linseed oil is not compatible with the resin mixtures.

The extracted lipids and epoxidized lipids (EL) can be blended with various known film forming cellulose derivatives, such as hydroxymethyl cellulose, to give films for coating solid food such as cheese and meat. They may also be added to gelatin to increase toughness and flexibility.

The following example is presented to further illustrate the invention.

EXAMPLE

One kilogram of alfalfa meal is added to one liter of a mixture of methyl ethyl ketone-ethanol (2:1) with stirring. The slurry is then filtered and the filter cake is resuspended in one liter of the same solvent mixture. After stirring, the slurry is filtered leaving a solvent insoluble residue 12. The two filtrates constituting the lipids extract in the solvent 30 are combined.

The solvent extract containing the lipids 30 is evaporated under pressure to remove the solvent and give about 92 g of lipids.

One kilogram of the solvent insoluble filter cake residue 12 is extracted with 7.5 liters of 0.3–0.4 percent sodium hydroxide with stirring for several minutes. The dilute alkali insoluble residue 14 is separated from the dilute alkali soluble extract 16 by decantation or filtration.

The dilute alkali soluble extract 16 is treated with 0.1–0.2 percent pancreatin and 0.02 percent bile sac powder 17 (based on 250 g of soluble extract, this would be 0.25 g pancreatin and 0.1 g of bile sac powder). The mixture is incubated at 45° C. for 24 hours and then filtered through cotton cloth. To the filtrate containing the soluble fraction 20 is added a small amount of calcium carbonate 29 to precipitate unpalatable lignins, acids, and resins, which are removed by filtration and discarded. The insoluble fraction 21 is discarded.

The dilute alkali insoluble fraction 14 is treated with 0.6–0.7 percent alkali (7.5 l/kg).

The resulting dilute alkali soluble extract 18 is adjusted to pH 5–7 by addition of HCl, $H_2SO_4$ or $H_3PO_4$ to cause protein, chloroplasts, resins and lignins 23 to flocculate out. The supernatant alkali soluble fraction 24 is discarded. The filtered precipitate 23 is adjusted to pH 8–10 by adding sodium hydroxide, then 2.5 g of pancreatin and 0.5–1.0 g of bile sac powder 26 are added, followed by a 24 hour incubation at 45° C. The digestion slurry is treated with $CaCO_3$ 27 and then filtered. After filtering the filtrate may be added to soluble fraction 20. Product 20 has an acceptable taste and is free of saponins. The insoluble fraction 28 is discarded.

Raw Materials Needed to Process 1 kg of Alfalfa Meal:
- 50–75 g sodium hydroxide
- 1–2 g pancreatin
- 0.1–0.2 g bile sac powder
- 2.5 liters of 50–50 mixture of ethanol and methyl ethyl ketone, most of which can be recovered, depending on how the lipids are used.

Summary of Products Produced from 1 kg of Alfalfa Meal:
- 100 g lipids 30 is obtained from which 15 grams of product 32 and 85 grams of product 31 are formed.
- 500 g of celloflour (19)
- 300–350 g edible extract (20)

If it is not desired to convert all of the meal to human food and lipids, the process can be modified. If celloflour is the only product desired, washing of alfalfa meal twice with 0.5% NaOH will produce a good flour. The soluble fraction could be converted to food according to the flow diagram. If only the lipids are desired, the lipids extraction could be carried out and the residue used for animal food. The parts can be made to work without the whole.

The products obtained from the various steps of the process may be used as follows:

Products 12 and 14: High fiber flour for monogastric animals used as is or refatted.

Product 19: High fiber flour for human consumption.

Product 20: Soluble extract food additive.

Product 23: A soluble product which could substitute for water soluble celluloses, such as methyl cellulose.

Product 30: Alcohol-ketone soluble lipids, which can be used as a plasticizer for plastics, rubber or asphalt when it is desired to form emulsions or incorporate water into the organic material.

Product 31: Lipids soluble in benzene and hydrocarbons which can be used in asphalt metal paint, undercoating, plastic and rubber. It gives a smooth texture to asphalt coating and superior covering power to asphalt paint on metal.

Product 33: A rich food fraction.

The foregoing detailed description has been given for clearness of understanding only, and no unnecessary limitations should be understood therefrom, as modifications will be obvious to those skilled in the art.

What is claimed is:

1. The process which comprises:
   extracting alfalfa or clover with an organic solvent to separate lipids therefrom, and leave a solvent insoluble residue,
   said solvent being a mixture of (1) a lower alkanol with a lower alkanone, (2) a lower alkanol with a lower alkanoic acid, or (3) a lower alkanol, a lower alkanone and a lower alkanoic acid,
   contacting the solvent insoluble residue with an aqueous alkali base, and
   separating the aqueous alkali base insoluble residue from a supernatant aqueous base solution of soluble alfalfa or clover constituents.

2. The process of claim 1 in which the solvent contains as ester of a lower alkanoic acid.

3. The process which comprises:
   extracting alfalfa or clover with an organic solvent mixture of (1) a lower alkanol with a lower alkanone, or (2) a lower alkanol with a lower alkanoic acid, or (3) a lower alkanol, a lower alkanone and a lower alkanoic acid, to separate lipids therefrom and leave a solvent insoluble residue, and
   separating the lipids from solution in the solvent.

4. The process of claim 3 in which the lipids are then extracted with a hydrocarbon solvent in which the lipids are soluble and carbohydrate and protein are insoluble thereby separating the insoluble carbohydrate and protein.

5. The process of claim 4 in which the insoluble carbohydrate and protein are treated with calcium carbonate to produce a food grade product comprising carbohydrate and protein.

6. The process which comprises:
   extracting alfalfa or clover with an organic solvent to separate lipids therefrom, and leave a solvent insoluble residue,
   said solvent being a mixture of (1) a lower alkanol with a lower alkanone, or (2) a lower alkanol with a lower alkanoic acid, or (3) a lower alkanol, a lower alkanone and a lower alkanoic acid,
   contacting the solvent insoluble residue with an aqueous base comprising sodium hydroxide, sodium carbonate, potassium hydroxide, potassium carbonate, magnesium hydroxide, magnesium carbonate, or calcium hydroxide or a mixture thereof, in aqueous solution and,
   separating the aqueous base insoluble residue from a supernatant aqueous base solution of soluble alfalfa or clover constituents.

7. The process of claim 6 in which the solvent contains an ester of a lower alkanoic acid.

* * * * *